United States Patent
Loesche et al.

(10) Patent No.: US 11,230,068 B2
(45) Date of Patent: Jan. 25, 2022

(54) COMPOSITE TOOL AND ASSOCIATED METHOD FOR MAKING A COMPOSITE PANEL

(71) Applicant: The Boeing Company, Chicago, IL (US)

(72) Inventors: Christopher R. Loesche, Bothell, WA (US); Steven Mark Dixon, Sammamish, WA (US)

(73) Assignee: The Boeing Company, Chicago, IL (US)

(*) Notice: Subject to any disclaimer, the term of this patent is extended or adjusted under 35 U.S.C. 154(b) by 61 days.

(21) Appl. No.: 16/691,802

(22) Filed: Nov. 22, 2019

(65) Prior Publication Data
US 2021/0154951 A1 May 27, 2021

(51) Int. Cl.
| | |
|---|---|
| *B29C 70/30* | (2006.01) |
| *B29C 70/54* | (2006.01) |
| *B32B 5/02* | (2006.01) |
| *B29L 31/30* | (2006.01) |
| *B29C 33/38* | (2006.01) |

(52) U.S. Cl.
CPC .............. *B29C 70/30* (2013.01); *B29C 70/54* (2013.01); *B32B 5/02* (2013.01); *B29C 2033/385* (2013.01); *B29L 2031/3076* (2013.01)

(58) Field of Classification Search
None
See application file for complete search history.

(56) References Cited

U.S. PATENT DOCUMENTS

| | | | |
|---|---|---|---|
| 10,437,231 | B2 | 10/2019 | Panciatici |
| 2016/0107432 | A1 | 4/2016 | Krajca et al. |
| 2016/0348644 | A1 | 12/2016 | Hayden et al. |
| 2019/0315075 | A1 | 10/2019 | Gill |

FOREIGN PATENT DOCUMENTS

| | | |
|---|---|---|
| EP | 0 901 849 | 3/1999 |

OTHER PUBLICATIONS

Extended European Search Report dated Apr. 26, 2021, in corresponding European application No. 20209033.8.

*Primary Examiner* — Barbara J Musser
(74) *Attorney, Agent, or Firm* — Womble Bond Dickinson (US) LLP

(57) ABSTRACT

A method of forming a tool includes applying a first build ply to an initial ply. A second build ply is applied to the first build ply. Successive build plies are applied to build on the second build ply, the successive build plies including a medial section of build plies and a last build ply. A surface defined by the last build ply, the first build ply, and leading edges of the build plies therebetween define a substantially curvature-continuous surface profile extending between a first segment and a second segment. A shape of the substantially curvature-continuous surface profile is determined based on an adjusted ply drop ratio for at least a portion of the successive build plies.

21 Claims, 9 Drawing Sheets

COMPOSITE TOOL AND ASSOCIATED METHOD FOR MAKING A COMPOSITE PANEL

BACKGROUND

Field of the Disclosure

The present disclosure relates to methods and tools for making structural panels, and more particularly, to methods and tools for producing a panel with a substantially curvature-continuous surface profile.

Description of Related Art

Composite structures and panels are used in a wide variety of applications. Composite panels for aircrafts and those used in other applications are formed using tools, such as an outer mold line (OML) tool or an inner mold line (IML) tool. Composite panels and tools for forming composite panels typically include layers of plies stacked together to form a structure defining a tooling surface.

Figure 1:
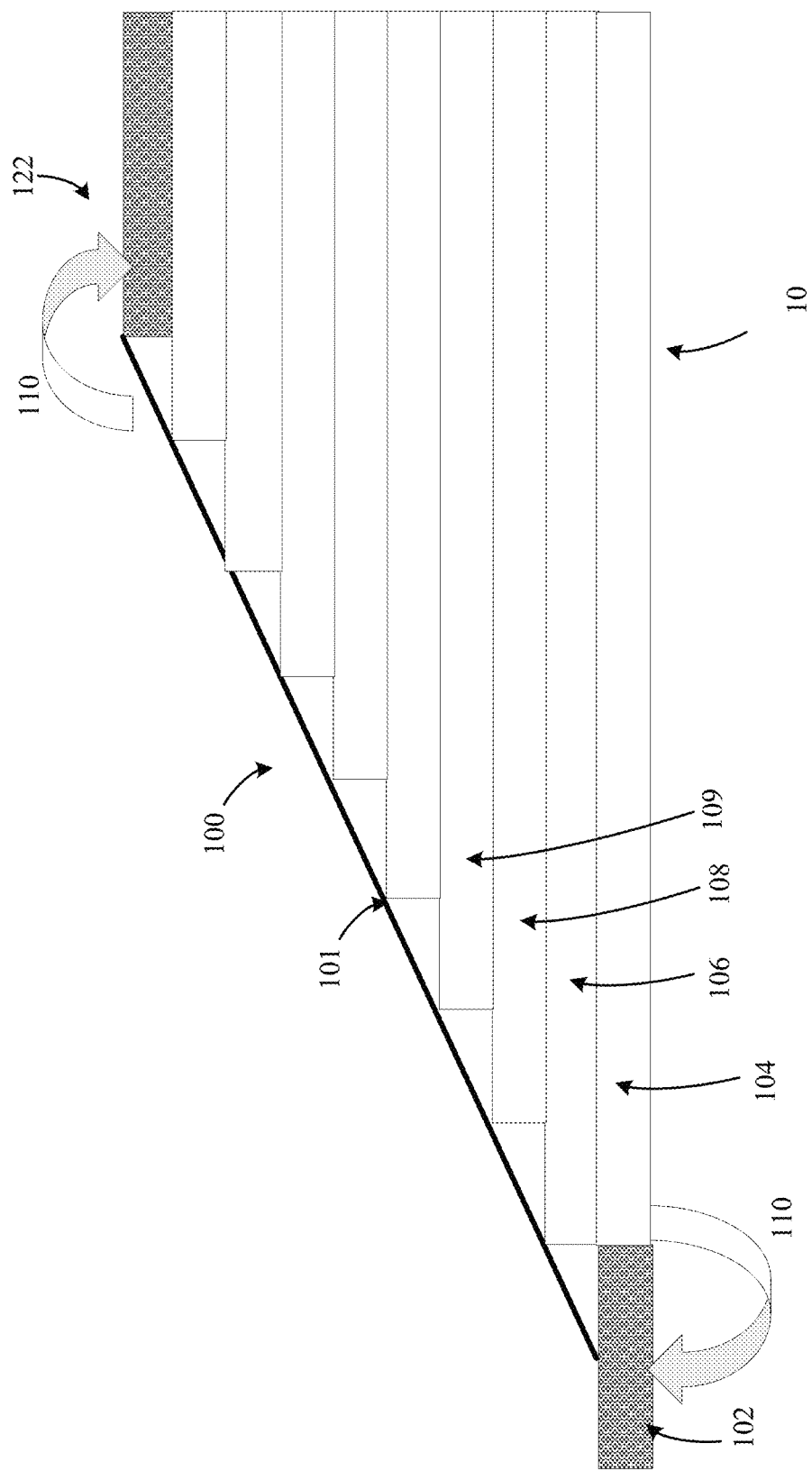

For tools used to form composite panels that are intended to span prominent and significant discontinuities due to changes in thickness or shape of the underlying structure, tooling surface profile becomes critical. Tooling surface profiles and resulting panel profiles that model discontinuities in a simplistic linear manner tend to lead to undesirable visible surface anomalies in the resultant composite panels. By way of an example, referring now to FIG. 1, a tool 10 with a linear surface profile 101 for forming a panel 100 spanning a discontinuity between a first segment 102 and a second segment 122 is illustrated. Layers of plies, such as 106, 108, and 109 are applied successively to an initial ply 104 to form the surface profile 101 of the panel 100 formed from the tool 10. Successive layers of plies may be staggered from one another by a ply drop. A ply drop is defined by a lateral displacement of one ply from a successive second ply. In FIG. 1, the ply drops across the tool 10 are constant, thereby resulting in a linear tooling surface profile 101 of the panel. This linear or flat tooling surface profile 101, when used to form a complex three dimensional panel, may result in a panel surface with visible surface anomalies (e.g., visible surface anomalies due to non-curvature-continuous transitions), even when the resulting panel is structurally sound. This is due to the nature of the surface 100 used to form the panel. The visible surface anomalies can be exaggerated for panels formed where surface discontinuities occur near a major joint, such as, for example, near a wing-to-body joint, an empennage-to-body joint, and so on. The visible surface anomalies may give the appearance of localized skin buckling, when in fact, there is no real skin buckling. This leads to unnecessary equipment down time and unscheduled inspections.

Additionally, if the ply drops are aggressive in the linear profile of the tooling surface, this may cause cap and flange compressions in the resulting panel and associated structural stiffeners, as indicated by the arrows 110 of FIG. 1. In some cases, this causes wrinkling in the resulting structural panel and associated structural stiffeners. Moreover, for panels formed from a combination of a flat OML surface with a IML having a non-tool bag surface, the profile of the IML surface may create compression zones in the interfacing stiffeners. On the other hand, if the ply drops are too gradual, this may lead to increased weight in the resulting structural panel.

Thus, when forming panels that span surface discontinuities due to changes in thickness or shape, rather than merely implementing a linear ramp surface profile as indicated in FIG. 1, a more complex consideration of profile for the configuration of a tooling surface used to form the panels is desirable. There is need to form tool surface profiles that prevent and/or minimize appearance of surface anomalies or other false indications of panel faults on the finished panel surface. In addition, there is need to improve quality and simplicity of forming such structural panels while minimizing weight of the panels.

SUMMARY

The above and other needs are met by aspects of the present disclosure which, in one aspect, provides a method of forming a tool for producing a panel spanning a discontinuity. The discontinuity is defined between a first segment and a second segment. The discontinuity further has a lateral displacement and a longitudinal displacement. The method of forming the tool includes applying a first build ply to an initial ply, where the initial ply partially co-extends with the first segment and at least spans the lateral displacement. The first build ply has a leading edge and a thickness. The method further includes the first build ply being applied to the initial ply such that the leading edge thereof is proximal to the first segment. Next, the method includes applying a second build ply to the first build ply, the second build ply having a leading edge and defining a thickness. The second build ply is applied to the first build ply such that the leading edge thereof is laterally displaced toward the second segment from the leading edge of the first build ply. The method further includes applying successive build plies to build on the second build ply, the successive build plies including a medial section of build plies and a last build ply, such that the last build ply partially co-extends with the second segment. Each of the successive build plies having a leading edge and a thickness. Each successive build ply is applied to a previous build ply such that the leading edge thereof is coincident with, or is laterally displaced toward the second segment from the leading edge of the previous build ply. The lateral displacement between the leading edges of the successive build ply and the previous build ply, in relation to the thickness of the successive build ply, defines a ply drop ratio. The ply drop ratio of successive build plies decreases up to the medial section and increases from the medial section to the last build ply such that a surface profile defined by the last build ply, the first build ply, and the leading edges of the build plies therebetween define a substantially curvature-continuous surface profile extending between the first segment and the second segment. Furthermore, prior to applying the successive build plies, the method further includes determining a shape of the substantially curvature-continuous surface profile based on an adjusted ply drop ratio for at least a portion of the successive build plies, wherein the adjusted ply drop ratio is directly proportional to a linear ply drop ratio, and inversely proportional to a softness factor and a ply drop number, the softness factor ranging from 0 to 1, the ply drop number being the number of the build ply between the first build ply and the last build ply.

Another aspect of the disclosure provides a method of producing a panel spanning a discontinuity, the discontinuity being defined between a first segment and a second segment, and having a lateral displacement and a longitudinal displacement. Such method includes forming a tool. The step of forming the tool includes applying a first build ply to an initial ply, the initial ply partially co-extending with the first segment and at least spanning the lateral displacement. The first build ply has a leading edge and a thickness. The first build ply is applied to the initial ply such that its leading edge is proximal to the first segment. The step of forming the tool further includes applying a first build ply to an initial ply, the initial ply partially co-extending with the first segment and at least spanning the lateral displacement, wherein the first build ply has a leading edge and a thickness. The first build ply is applied to the initial ply such that its leading edge is proximal to the first segment. The step of forming the tool further comprises applying successive build plies to build on the second build ply, the successive build plies including a medial section of build plies and a last build ply, such that the last build ply partially co-extends with the second segment, wherein each of the successive build plies have a leading edge and a thickness. Each successive build ply is applied to a previous build ply such that the leading edge thereof is coincident with, or is laterally displaced toward the second segment from the leading edge of the previous build ply. The lateral displacement between the leading edges of the successive build ply and the previous build ply, in relation to the thickness of the successive build ply, defines a ply drop ratio. The ply drop ratio of successive build plies decreases up to the medial section and increases from the medial section to the last build ply such that a surface profile defined by the last build ply, the first build ply, and the leading edges of the build plies therebetween define a substantially curvature-continuous surface profile extending between the first segment and the second segment. Furthermore, prior to applying the successive build plies, the method further includes determining a shape of the substantially curvature-continuous surface profile based on an adjusted ply drop ratio for at least a portion of the successive build plies, wherein the adjusted ply drop ratio is directly proportional to a linear ply drop ratio, and inversely proportional to a softness factor and a ply drop number, the softness factor ranging from 0 to 1, the ply drop number being the number of the build ply between the first build ply and the last build ply. The method of producing the panel also includes forming a panel by applying a panel assembly material to the formed tool such that the panel assembly material extends from the first segment to the second segment, in conformity with the substantially curvature-continuous surface profile extending therebetween.

Yet another aspect of the disclosure provides a tool for producing a panel spanning a discontinuity, the discontinuity being defined between a first segment and a second segment, and having a lateral displacement and a longitudinal displacement. Such a tool comprises a first build ply applied to an initial ply, the initial ply partially co-extending with the first segment and at least spanning the lateral displacement, the first build ply having a leading edge and defining a thickness, and the first build ply being arranged such that the leading edge thereof is proximal to the first segment. The tool further includes a second build ply applied to the first build ply, the second build ply having a leading edge and defining a thickness, and the second build ply being arranged such that the leading edge thereof is laterally displaced toward the second segment from the leading edge of the first build ply. The tool further includes successive build plies applied to build on the second build ply, the successive build plies including a medial section of build plies and a last build ply, the last build ply partially co-extending with the second segment, each of the successive build plies having a leading edge and defining a thickness, and being arranged relative to a previous build ply such that the leading edge thereof is coincident with, or is laterally displaced toward the second segment from, the leading edge of the previous build ply, the lateral displacement between the leading edges of the successive build ply and the previous build ply, in relation to the thickness of the successive build ply, defining a ply drop ratio, the ply drop ratio of successive build plies decreasing up to the medial section and increasing from the medial section to the last build ply such that a surface profile defined by the last build ply, the first build ply, and the leading edges of the build plies therebetween define a substantially curvature-continuous surface profile extending between the first segment and the second segment. A shape of the substantially curvature-continuous surface profile is based on an adjusted ply drop ratio for at least a portion of the successive build plies, wherein the adjusted ply drop ratio is directly proportional to a linear ply drop ratio, and inversely proportional to a softness factor and a ply drop number, the softness factor ranging from 0 to 1, the ply drop number being the number of the build ply between the first build ply and the last build ply.

These and other features, aspects, and advantages of the present disclosure will be apparent from a reading of the following detailed description together with the accompanying drawings, which are briefly described below. The present disclosure includes any combination of two, three, four, or more features or elements set forth in this disclosure, regardless of whether such features or elements are expressly combined or otherwise recited in a specific embodiment description herein. This disclosure is intended to be read holistically such that any separable features or elements of the disclosure, in any of its aspects and embodiments, should be viewed as intended, namely to be combinable, unless the context of the disclosure clearly dictates otherwise.

It will be appreciated that the summary herein is provided merely for purposes of summarizing some example aspects so as to provide a basic understanding of the disclosure. As such, it will be appreciated that the above described example aspects are merely examples and should not be construed to narrow the scope or spirit of the disclosure in any way. It will be appreciated that the scope of the disclosure encompasses many potential aspects, some of which will be further described below, in addition to those herein summarized. Further, other aspects and advantages of such aspects disclosed herein will become apparent from the following detailed description taken in conjunction with the accompanying drawings which illustrate, by way of example, the principles of the described aspects.

BRIEF DESCRIPTION OF THE SEVERAL VIEWS OF THE DRAWING(S)

Figure 2:
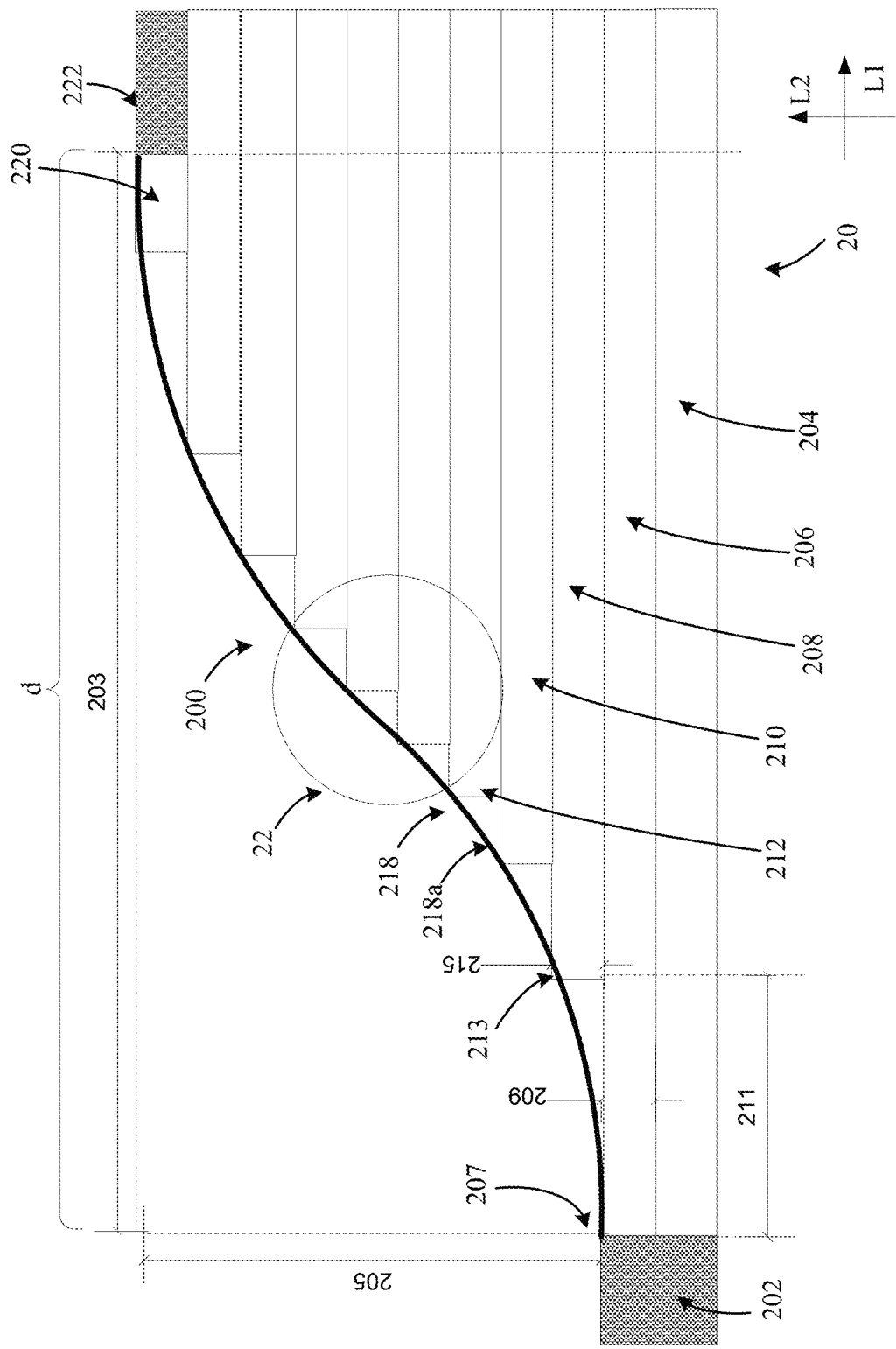
Figure 3:
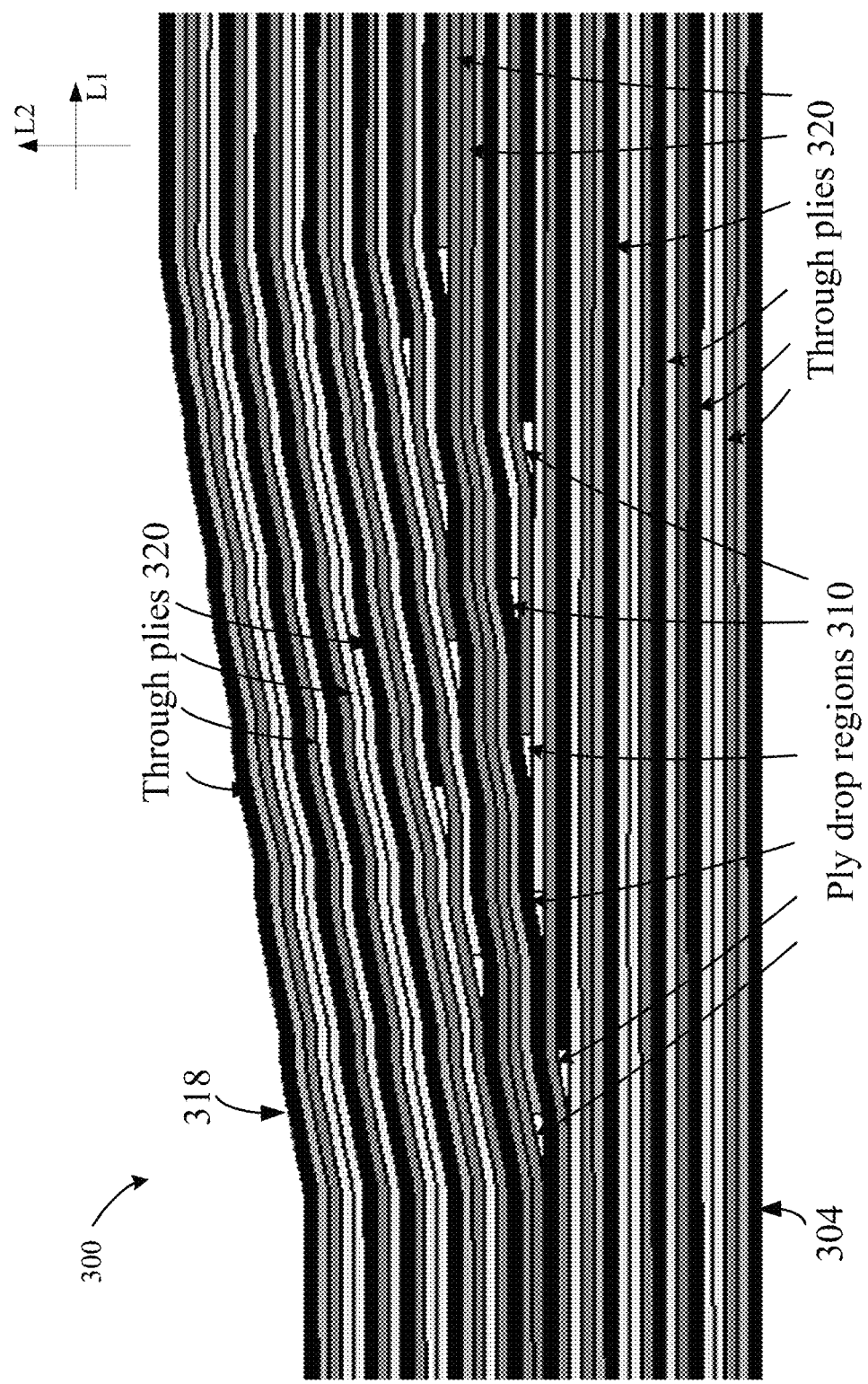
Figure 4:
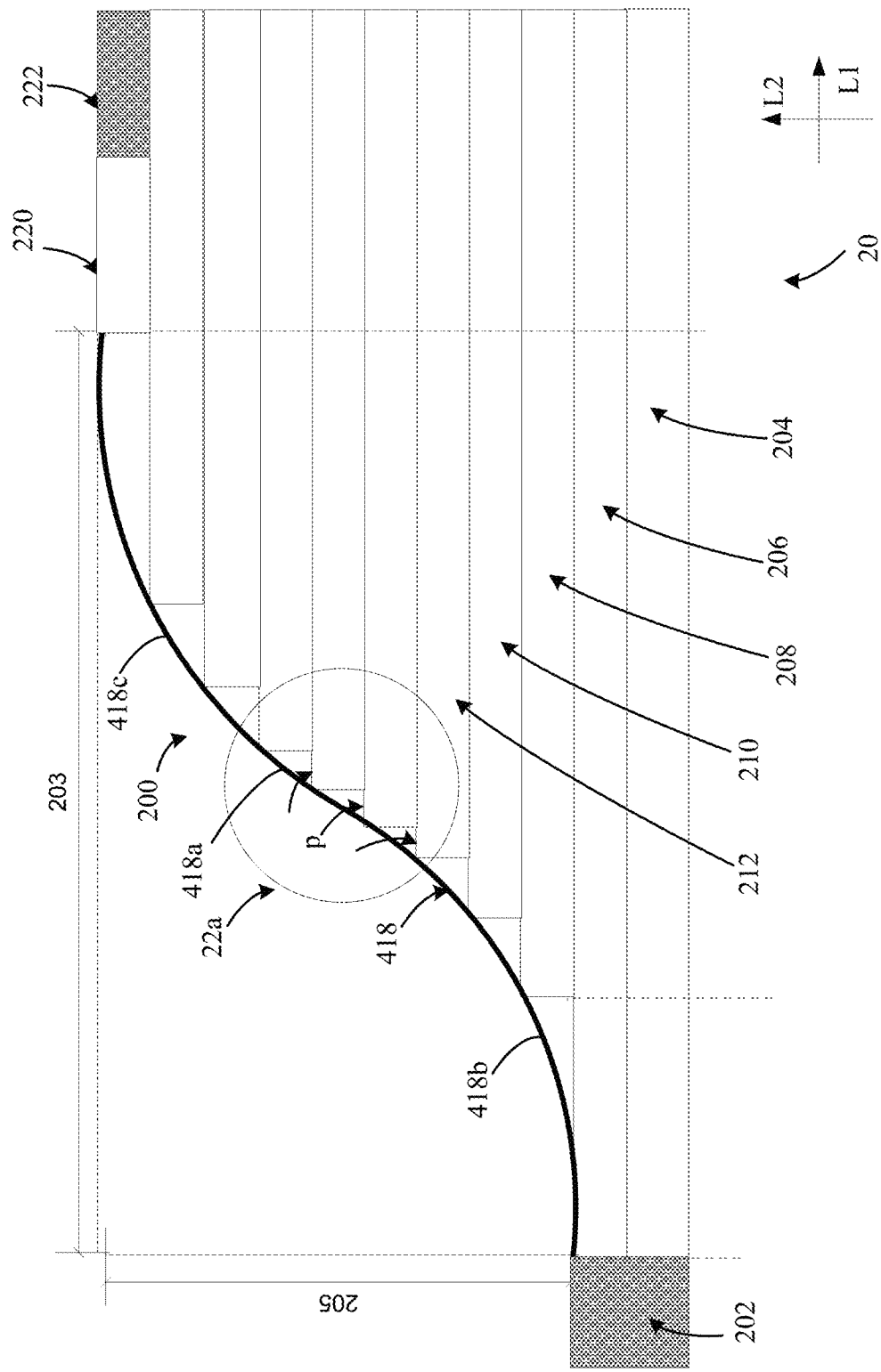
Figure 5:
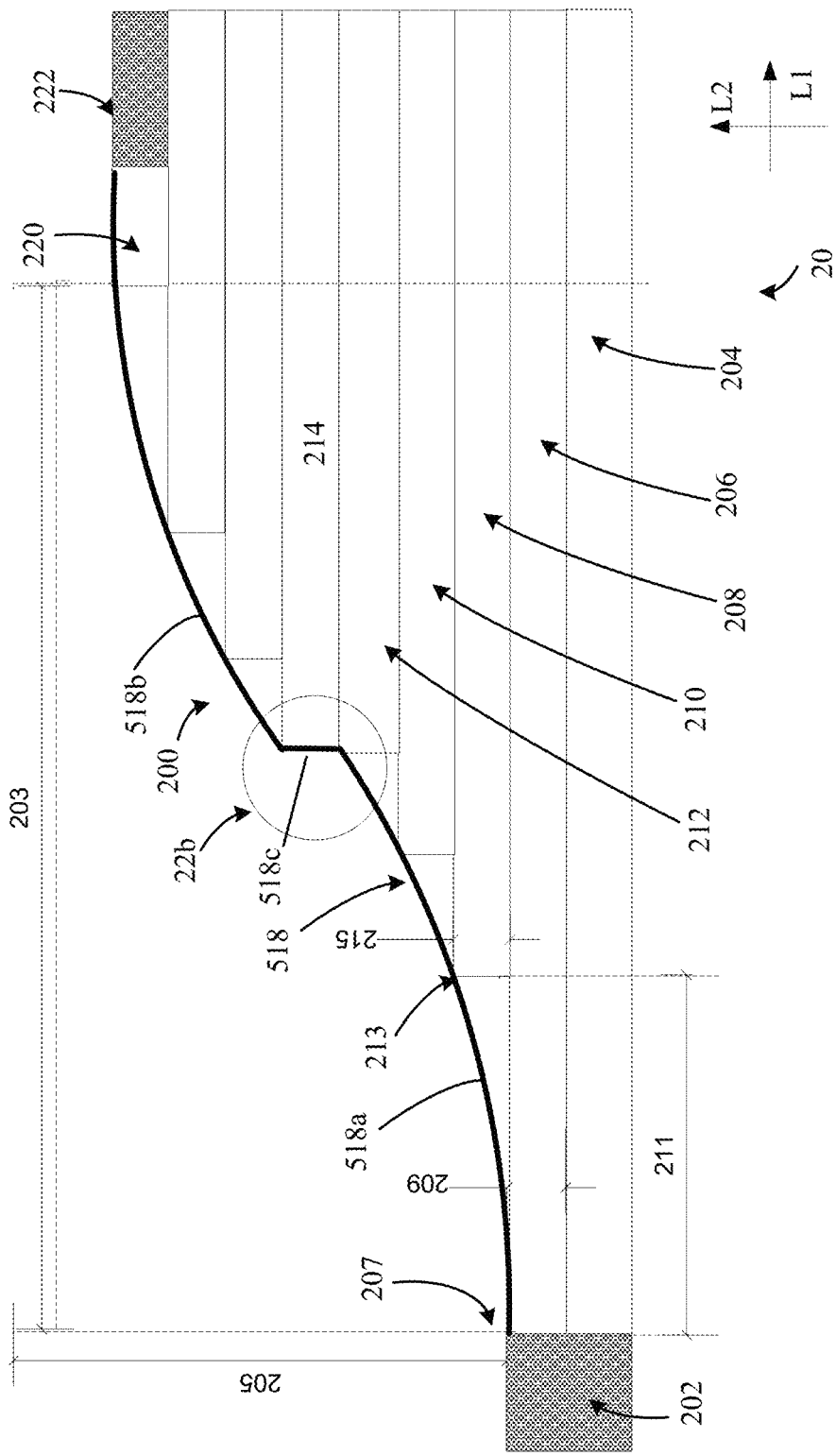
Figure 6:
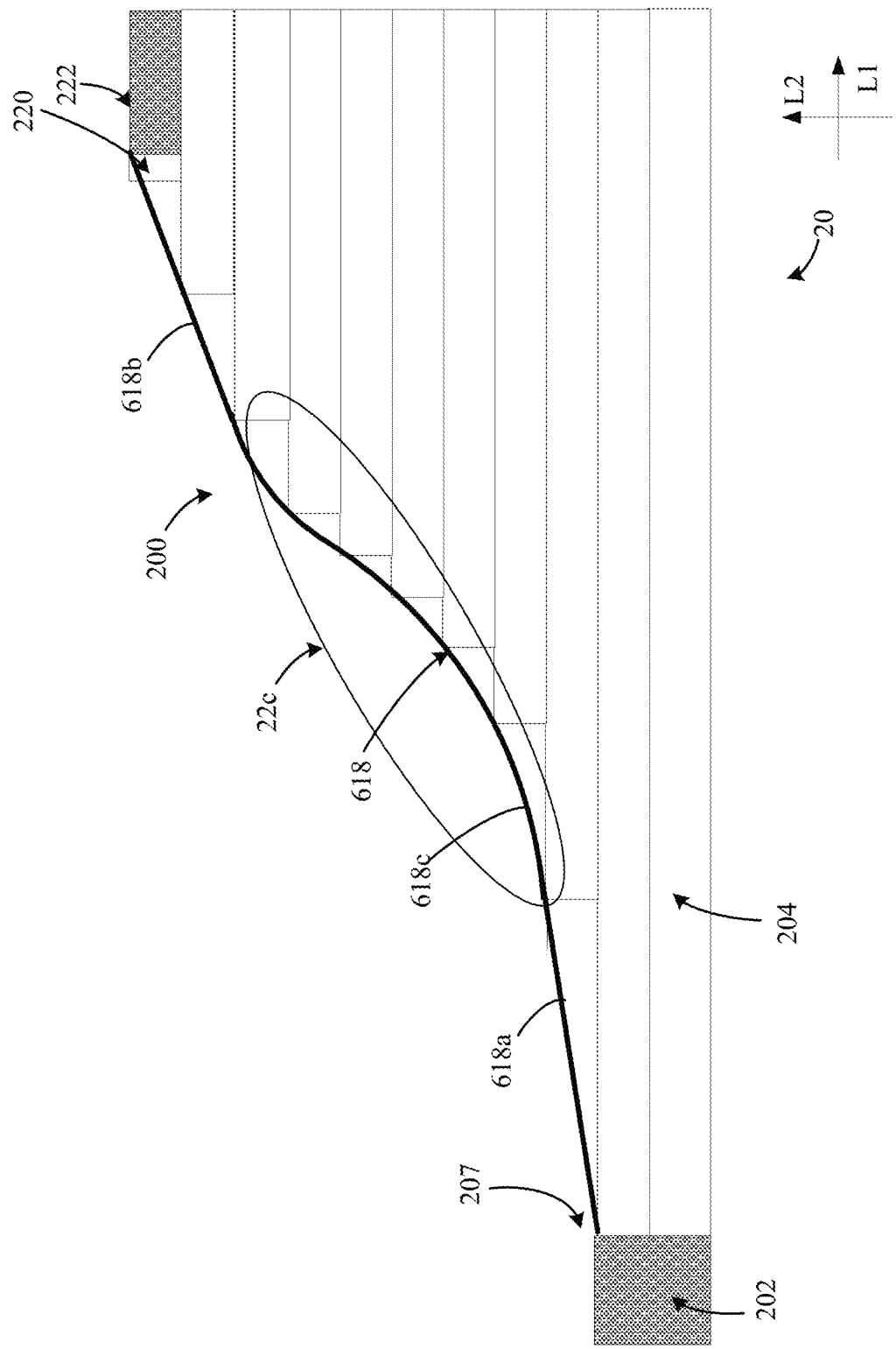
Figure 7A:
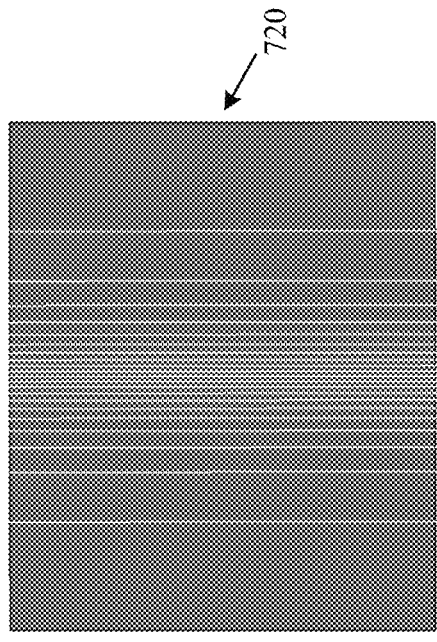
Figure 7B:
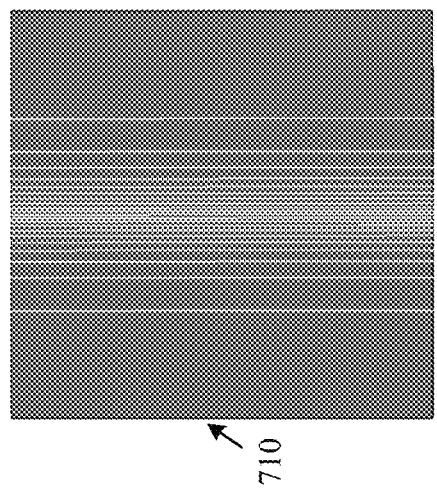
Figure 7C:
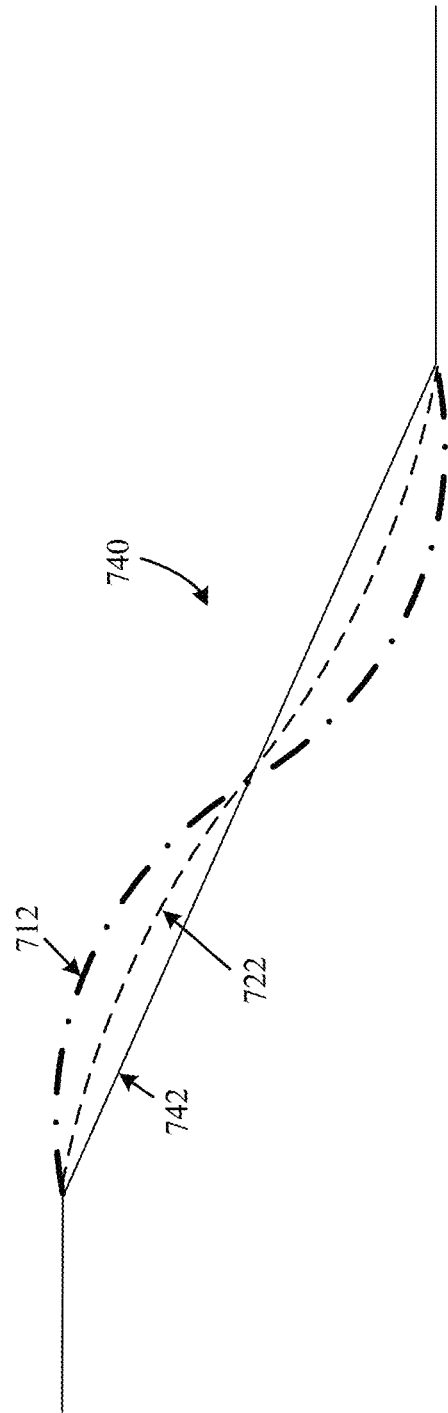
Figure 8:
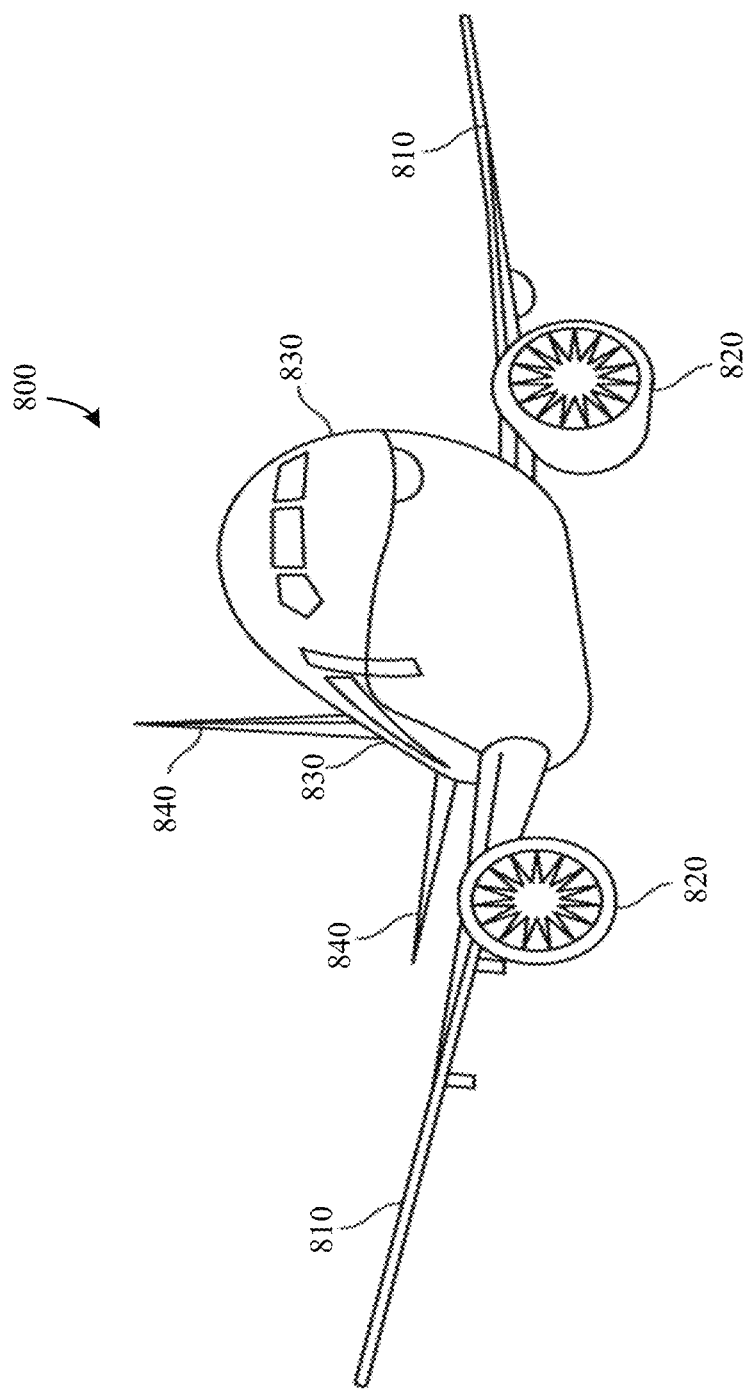
Figure 9:
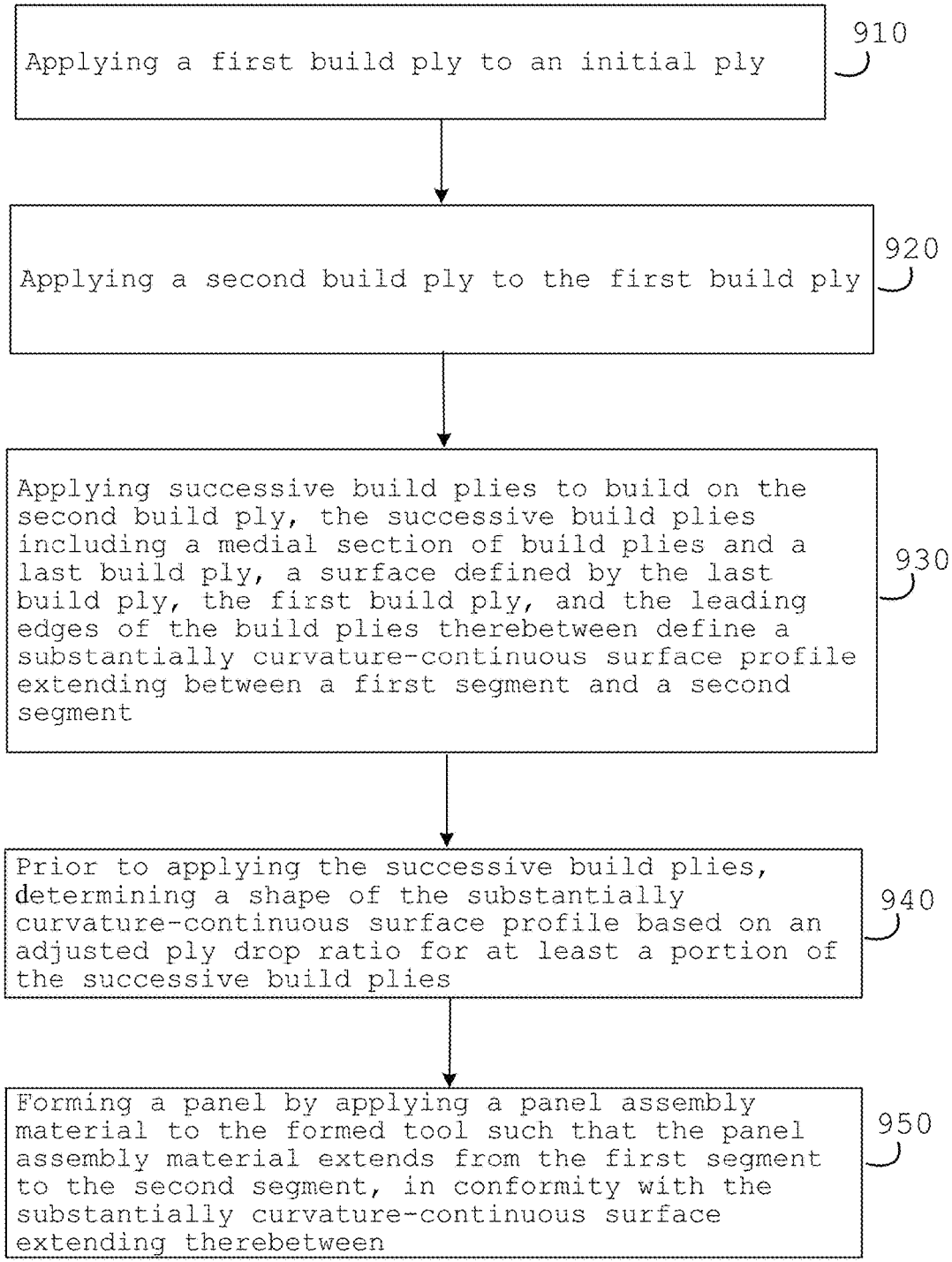

Having thus described the disclosure in general terms, reference will now be made to the accompanying drawings, which are not necessarily drawn to scale, and wherein:

FIG. 1 schematically illustrates a representative tool surface formed using a traditional method;

FIG. 2 schematically illustrates a representative tool surface and method, according to an embodiment of the present disclosure;

FIG. 3 schematically illustrates a representative panel formed by a tool, according to an embodiment of the present disclosure;

FIG. 4 schematically illustrates another representative tool surface and method, according to an embodiment of the present disclosure;

FIG. 5 schematically illustrates another representative tool surface and method, according to an embodiment of the present disclosure;

FIG. 6 schematically illustrates another representative tool surface and method, according to an embodiment of the present disclosure;

FIGS. 7A, 7B, and 7C schematically illustrates impact of a softness factor on a panel surface profile, according to an example aspect of the present disclosure;

FIG. 8 illustrates an example aircraft indicating one or more portions comprising panels formed from one or more embodiments of the present disclosure;

FIG. 9 schematically illustrates a method of forming a tool for producing a panel spanning a discontinuity, according to an embodiment of the disclosure.

DETAILED DESCRIPTION OF THE DISCLOSURE

The present disclosure now will be described more fully hereinafter with reference to the accompanying drawings, in which some, but not all aspects of the disclosure are shown. Indeed, the disclosure may be embodied in many different forms and should not be construed as limited to the aspects set forth herein; rather, these aspects are provided so that this disclosure will satisfy applicable legal requirements. Like numbers refer to like elements throughout.

FIGS. 2 and 4-6 schematically illustrate a tool 20 for producing a panel 200 spanning a discontinuity d, in accordance with one or more tools and/or methods described in this disclosure. In various embodiments, the panel 200 forms a portion of an aircraft wing, a portion of an aircraft nacelle, a portion of an aircraft fuselage, a portion of an aircraft empennage or a portion of another aircraft structure. In other embodiments, internal components such as composite ribs, spars, or stiffeners may be formed using the tools and/or methods disclosed herein. The tool 20 and/or panel 200 may also find use in other applications, such as in structural components for automobiles, boats, ships, and so on. In general, the discontinuity d and the tool 20 are oriented relative to a lateral axis L1 and a longitudinal axis L2. As indicated in FIG. 2, the discontinuity d is defined between a first segment 202 and a second segment 222, with the first segment 202 and the second segment 222 having a lateral displacement 203 and a longitudinal displacement 205 therebetween. Although the discontinuity d in FIG. 2 is depicted as a 2-dimensional space, in some instances the discontinuity d defines a complex 3-dimensional space that is spanned by the panel 200.

Referring again to FIG. 2, the tool 20 includes an initial ply 204 that partially co-extends with the first segment 202. In an embodiment, the initial ply 204 substantially co-extends with the first segment 202. The initial ply 204 spans the lateral displacement 203 and establishes an initial or base layer for the tool 20. The tool 20 further includes a first build ply 206 applied to the initial ply 204 wherein the first build ply 206 is arranged such that its leading edge 207 is adjacent or proximal to the first segment 202, and wherein the first build ply 206 has a thickness 209. The tool 20 further includes a second build ply 208 applied to the first build ply 206, wherein the second build ply 208 has a leading edge 213 and a thickness 215. The second build ply 208 is arranged such that its leading edge 213 is laterally displaced (along L1) towards the second segment 222 from the leading edge 207 of the first build ply 206. In FIG. 2, this is indicated as displacement 211 between the leading edge 207 of the first build ply 206 and the leading edge 213 of the second build ply 208.

Referring again to FIG. 2, the tool 20 further includes successive build plies applied to build on the second build ply 208. For example, successive build plies 210 and 212 are applied to build on the second build ply 208. The successive build plies that are applied to build on the second build ply 208 include a medial section 22 of build plies and a last build ply 220. Applying successive build plies over an initial or base ply to form a layered panel may be performed using common layup techniques and processes, including gluing, curing, fastening, and lamination procedures.

Referring back to FIG. 2, the last build ply 220 partially co-extends with the second segment 222. In an embodiment, the last build ply 220 substantially co-extends with the second segment 222. Each successive build ply between the first build ply 206 and the last build ply 220 has a respective leading edge and defines a respective thickness. Each successive build ply is arranged with respect to the previous build ply such that its leading edge is either coincident with the leading edge of the previous build ply or it is laterally displaced toward the second segment 222 from the previous build ply. The lateral displacement between leading edges of successive build ply and the previous build ply in relation to the thickness of the successive build ply defines a ply drop ratio. The ply drop ratio is represented in equation form as:

$$\text{Ply drop ratio} = \frac{\text{lateral displacement}}{\text{thickness}}$$

For example, the ply drop ratio between the first build ply 206 and the second build ply 208 is expressed as a ratio of the lateral displacement 211 and the thickness 215 of the second build ply 208. In an example, ply drop ratios across successive build plies vary throughout the tool. In another example, ply drop ratios for at least a portion of successive build plies vary throughout the tool 20 while ply drop ratios across another portion of successive build plies (e.g., the medial portion) may be constant at certain sections of the tool 20. A surface profile connecting the leading edges of all the build plies of the tool 20, in some instances, defines a substantially curvature-continuous surface profile 218 of the panel 200 that extends between the first segment 202 and the second segment 222. In one embodiment, the substantially curvature-continuous surface profile 218 is subsequently used to form a panel 200 thereon, wherein the panel 200 is entirely curvature-continuous due to the ply drop ratios between successive build plies varying across the entire tool 20. In an embodiment, the substantially curvature-continuous surface profile 218 may include a successive build plies that have a ply drop ratio of less than 100:1. In another embodiment, the substantially curvature-continuous surface profile 218 may include an S-curve surface profile 218a (e.g., as shown in FIG. 2). In another embodiment, the substantially curvature-continuous surface profile 218 includes a medial section 22 that has a linear profile (e.g., as shown in FIGS. 4 and 5). In yet another embodiment, the substantially curvature-continuous surface profile 218 includes linear surface profiles in the end portions adjacent the first build ply 206 and the last build ply 220 (e.g., as shown in FIG. 6).

Within examples, the substantially curvature continuous profile has an amount of less than 25% of the profile that includes one or more linear portions. In these examples, the substantially curvature continuous surface profile is curvature continuous along 75% or more of the length of the profile and has at most 25% of the profile that includes one or more linear portions. Within examples, the substantially curvature continuous surface profile 218 is curvature continuous throughout the entire profile. Within examples, the substantially curvature continuous profile 218 includes portions that are discontinuous with the curvature continuous portions. Such a profile may be dictated by the configuration of the structural component that includes the panel.

In an embodiment, the tool 20 that forms the panel 200 illustrated with reference to FIG. 2 includes a curvature-continuous surface profile 218. In other embodiments, a curvature continuous surface profile forming part of a panel surface is not entirely part of the tool 20. For example, the tool 20 can include a different type of surface (for example, a flat surface) which is used to build the curvature-continuous surface profile 218 of the panel 200. Additionally, in an embodiment, the tool 20 may be applied to the panel either towards the initial ply 204 or adjacent to the curvature continuous surface profile 218. This can depend on whether the panel 200 is produced from an Outer Mold Layer (OML) tool or Inner Mold Layer (IML) tool. In another embodiment, the tool 20 may include a flat OML tool surface and may include an IML with a non-tool bag surface that may include the curvature-continuous surface profile 218.

In one embodiment of the disclosure, the substantially curvature-continuous surface profile 218 includes tangent continuous regions or curvature continuous regions outside the medial section 22, as well as a smooth transition in curvature through the medial section 22. This significantly reduces compression zones in the formed tool surface adjacent to the first build ply 206 and the last build ply 220 while improving laydown ability.

FIG. 2 illustrates successive build plies 208, 210, 212, and so on with each successive ply dropping with respect to the preceding ply. In another embodiment, the panel 200 or the tool 20 may include regions where build plies 208, 210, 212 do not include ply drops across each successive build ply. For instance, the panel 200 or the tool 20 may include regions where some plies drop with respect to the preceding plies and some plies that follow the shape of the tool or panel surface profile. This is illustrated in FIG. 3, which shows a panel 300 formed from a tool, such as the tool 20, wherein the build plies that drop (for example, as indicated by ply drop regions 310) are interspersed throughout the panel along with build plies that don't drop and thus follow the contour of the preceding ply (for example, as indicated by through plies 320). As illustrated, there are some through plies 320 that follow the substantially curvature continuous surface profile 318 of the panel 300 and some through plies 320 that follow the base or initial ply 304 of the panel 300. The ply drop regions 310 illustrated in the panel 300 in FIG. 3 is provided by way of an example, and the panel 300, in some instances, includes ply drop regions 310 interspersed with respect to the through plies 320 in different arrangements in the alternative, based on the requirements of the panel 300.

Referring now to FIG. 4, one embodiment comprises a substantially curvature-continuous surface profile 418 of the tool 20 for forming a panel 200 thereon, with the substantially curvature-continuous surface profile 418 having a medial section 22a with a constant ply drop ratio p across successive build plies. In this embodiment, the surface profile 418 has a substantially linear portion 418a in the medial section 22a, while including curvature-continuous sections 418b and 418c toward the first build ply 206 and the final build ply 220 respectively.

In another embodiment illustrated with reference to FIG. 5, a surface profile 518 of the tool for forming a panel 200 thereon has a medial section 22b that includes one or more plies with no ply drops. In an embodiment illustrated in FIG. 5, the medial region 22b includes a linear portion formed by single ply 214. Since there are no ply drops across the medial section 22b, the ply drop ratio across the medial region 22b is zero. In such instances, where the medial section 22b does not include any ply drops, the medial section 22b defines a vertical portion 518c, while including curvature continuous sections 518a and 518b in the surface profile 518, as illustrated in FIG. 5. In another embodiment, the medial region 22b may include successive build plies with no ply drop ratio across the medial region 22b.

In another embodiment of the disclosure, the medial section 22 includes successive plies with a linearly varying ply drop ratios. For example, for successive build plies with constant thickness, lateral displacement of successive build plies may be a constant multiple of lateral displacement associated with the previous build ply. When the ply drop ratios across successive build plies in the medial region 22 are constant, linear or zero, the surface profile 218 connecting leading edges of the successive build plies in the medial region 22 defines a linear surface profile, as indicated with reference to FIG. 4-5.

In another embodiment, the substantially curvature-continuous surface profile 218 extending between the first segment 202 and the second segment 222 forms a curvature continuous surface profile 218 that is an S-curve surface profile 218a (FIG. 2). The S-curve surface profile 218a has successive build plies with ply drop ratios that vary throughout the S-curve surface profile 218a from the first segment 202 to the second segment 222. This blended surface profile of the substantially curvature-continuous surface 218 effectively minimizes, reduces, or eliminates apparent deviations in the panel formed on the tool, wherein such apparent deviations are present in the underlying structure to which the panel is applied. The S-curve surface profile 218a is provided by way of an example, and the surface profile 218, in some instances, includes curves or splines of various complexities in the alternative. Also, as indicated earlier, when a flat surface of the tool 20 is adjacent to the first segment 202, the S-curve 218a formed is part of a non-tooled surface. In other embodiments, the S-curve 218a may be formed on or adjacent to the tool surface 20, and the non-tooled surface may be adjacent the first segment 202.

In one embodiment illustrated with reference to FIG. 6, a portion of the curvature-continuous surface profile 618 has regions adjacent to the first build ply 206 and/or a region adjacent to the last build ply 220 is not curvature-continuous with the first build ply 206 or the last build ply 220, respectively. In such instances, the portion of the substantially curvature-continuous surface profile 618 adjacent to the first build ply 206 (618a) or the last build ply 220 (618b) is tangent-continuous or linear and has a curvature-continuous surface profile 618c in the medial region 22c. In another embodiment, the portion of the substantially curvature-continuous surface profile adjacent to the first build ply 206 or the last build ply 220 is curvature-continuous while the portion of the substantially curvature-continuous surface profile adjacent to the medial ply region 22 is linear or tangent-continuous.

Within examples, an algorithm determines the ply drop ratios of successive build plies in a linear or non-linear manner from the first build ply 206 to a middle ply in the medial section 22 to form the surface profile 218 as a smooth surface profile. The algorithm determines an optimum surface profile that minimizes internal stresses and strains that may otherwise result due to sharp discontinuities in the panel formed from the tool surface profile 218.

Within examples, prior to applying the successive build plies, a shape of the substantially curvature-continuous surface profile is determined based on an adjusted ply drop ratio for at least a portion of the successive build plies. Referring again to FIGS. 2, 4-6, the shape of the substantially curvature-continuous surface profiles 218, 318, 418, 518, 618 or the S-curve surface profile 218a are based on an algorithm that determines an adjusted ply drop ratio for at least a portion of the successive build plies. Within examples, the shape of the substantially curvature-continuous surface profiles are based on an algorithm that determines an adjusted ply drop ratio for each of the successive build plies. Within examples, the shape of the substantially curvature-continuous surface profile is determined prior to applying the first and second build plies.

The adjusted ply drop ratio is directly proportional to a linear ply drop ratio, and inversely proportional to a softness factor and a ply drop number. An equation representing the adjusted ply drop ratio for the successive build plies forming the substantially curvature-continuous surface profile 218 is represented as:

$$\text{Adjusted ply drop ratio} = \frac{\text{Linear ply drop ratio}}{\text{Softness Factor} \times \text{Ply drop number}}$$

The softness factor in the equation is similar to a tension control factor in determining a shape of a spline, and typically ranges from 0 to 1. The smaller the softness factor, the softer (more blended) is the resulting surface profile 218. In one embodiment, the softness factor ranges from 0.25 and 0.5. FIGS. 7A, 7B, and 7C illustrate the impact of softness factor on a resulting panel surface. For example, FIGS. 7A and 7B show top views 710 and 720 respectively of two panels formed with different softness factors. Panel 710 of FIG. 7A is formed with a substantially curvature-continuous surface profile, similar to the surface profile 218 illustrated in FIG. 2, having a softness factor of 0.5. The lines in the panel 610 indicate the ply drop location through the panel. Panel 720 of FIG. 7B is formed with a substantially curvature-continuous surface profile, similar to the surface profile 218 illustrated in FIG. 2, having a softness factor of 0.33. As indicated, the ply drops indicated with lines in panel 720 are more gradual compared with that illustrated in panel 710. This can also be illustrated in a cross-sectional overlay depicted at 740 in FIG. 7C. In 740, surface profile 712 corresponds to a cross-sectional surface of the panel 710 of FIG. 7A and surface profile 722 corresponds to a cross-sectional surface of the panel 720 of FIG. 7B. Surface 742 shows a cross-section corresponding to a linear surface profile, similar to surface profile 101 of FIG. 1. As illustrated in FIG. 7C, a smaller softness factor (0.33) results in a surface profile 722 with gentler curvature that is closer to a linear surface profile, such as 742, than a higher softness factor (0.5) that results in a surface profile 712 that has a more aggressive curvature, and which deviates further from the linear surface profile 742. The surface profile 722 results in a longer transition between discontinuities compared with the surface profile 712.

The ply drop number is the number of the build ply between the first build ply and the last build ply. For example, referring to FIG. 2, the ply drop number of the build ply 212 is 3 since it is the third build ply from the first build ply 206, the ply drop number of the next build ply is 4 since it is the fourth build ply from the first build ply 206, and so on.

When the panel 200 formed by the tool 20 is mirrored about the medial section 22, the equation for the adjusted ply drop ratio is used to determine ply drop ratio for half of the successive build plies from the first build ply to the medial section 22. Ply drops for the other half of the successive build plies based on the adjusted ply drop ratios is symmetrical about the medial section 22.

In one embodiment, the shape of the substantially curvature-continuous surface profile 218 is further based on a faceted ply drop ratio. The faceted ply drop ratio is a maximum of a predetermined minimum ply drop ratio and the adjusted ply drop ratio, which is represented by the following equation:

Faceted ply drop ratio=Maximum of (Min ply drop ratio or Adjusted ply drop ratio)

The minimum ply drop ratio is based in part on the type of panel 200 formed by the tool 20. In one embodiment, the minimum ply drop ratio is about 10:1. In other embodiments, an acceptable minimum ply drop ratio is about 20:1. The faceted ply drop ratio defines an optimum shape of the substantially curvature-continuous surface profile with a constraint of not allowing the ply drop ratios to fall below the minimum ply drop ratio.

Ply drop ratios of the successive build plies range between about 10:1 and about 500:1. Based on the requirement of the panel associated with the blended surface profile 218, more aggressive surface profiles (with higher rate of change of ply drop ratios) or gentler surface profiles (with lower rate of change of ply drop ratios) may be formed. Adjusting the ply drop ratio of the successive build plies to obtain an aggressive or gentler blended surface profile 218 is based on minimizing apparent (or visible) deviations in the panel 200 formed from the tool 20.

In an embodiment, a surface of the tool 20, having a panel assembly material applied over the substantially curvature-continuous surface profile 218 thereof to form the panel 200 extending between the first segment 202 and the second segment 222, defines an outer mold line (OML) of the formed panel 200 or defines an inner mold line (IML) of the formed panel 200.

Referring now to FIG. 8, an example aircraft 800 is illustrated. In various embodiments of the disclosure, the panel 200 may form a portion of an aircraft wing 810, a portion of an aircraft nacelle 820, a portion of an aircraft fuselage 830, a portion of an aircraft empennage 840 or a portion of another aircraft structure.

Although FIG. 2, 4-8 illustrate a definite number of build plies, the disclosure is not limited to the number of successive build plies indicated herein. For example, FIG. 2 indicate 9 build plies between the initial build ply 204 and the last build ply 220. The number of build plies between the initial build ply 204 and the last build ply 220 is by way of example and are not be construed as limiting the disclosure. Other embodiments may include different number of build plies based on the location and type of structure formed from the panel or tool of this disclosure.

In accordance with the foregoing, other aspects of the present disclosure provide a method 900 of forming a tool for producing a panel spanning a discontinuity d, as shown for example in FIG. 9, wherein the discontinuity is defined between a first segment 202 and a second segment 222 and having a lateral displacement 203 and a longitudinal displacement 205, as indicated in FIGS. 2, 4-7. In such aspects, the method 900 includes at step 910 applying a first build ply 206 to an initial ply 204, with the initial ply 204 partially co-extending with the first segment 202 and at least spanning the lateral displacement 203. The first build ply 206 has a leading edge 207 and a thickness 209. The method includes applying the first build ply 206 to the initial ply 204 such that the leading edge 207 of the first build ply 206 is proximal or adjacent to the first segment 202. Next, the method 900 includes at step 920 applying a second build ply 208 to the first build ply 206, the second build ply 208 having a leading edge 213 and defining a thickness 215, and the second build ply 208 being applied to the first build ply 206 such that its leading edge 213 is laterally displaced toward the second segment 222 from the leading edge 207 of the first build ply 206.

Furthermore, the method 900 includes at step 930 applying successive build plies to build on the second build ply 208, the successive build plies including a medial section 22 of build plies and a last build ply 220, such that the last build ply 220 partially co-extends with the second segment 222. Each of the successive build plies has a leading edge and defines a thickness and is applied to a previous build ply such that its leading edge is coincident with, or is laterally displaced toward the second segment 222 from the leading edge of the previous build ply. The lateral displacement between the leading edges of the successive build ply and the previous build ply, in relation to the thickness of the successive build ply, defines a ply drop ratio. The ply drop ratio of successive build plies decreases up to the medial section 22 and increases from the medial section 22 to the last build ply 220 such that a surface profile 218 defined by the last build ply 220, the first build ply 206, and the leading edges of the build plies therebetween define a substantially curvature-continuous surface profile 218 extending between the first segment 202 and the second segment 222.

The method 900 includes at step 940, prior to applying the successive build plies, determining a shape of the substantially curvature-continuous surface profile 218 based on an adjusted ply drop ratio for at least a portion of the successive build plies, wherein the adjusted ply drop ratio is directly proportional to a linear ply drop ratio, and inversely proportional to a softness factor and a ply drop number, the softness factor ranging from 0 to 1, the ply drop number being the number of the build ply between the first build ply 206 and the last build ply 220. Within examples, the method further includes at step 950, forming a panel 200 by applying a panel assembly material to the formed tool 20 such that the panel assembly material extends from the first segment 202 to the second segment 222, in conformity with the substantially curvature-continuous surface 218 extending therebetween.

In some instances, the substantially curvature-continuous surface profile extending between the first segment 202 and the second segment 222 forming the surface profile 218 further forms an S-curve surface profile 218a. In the method 900 presented above, the S-curve surface profile 218a is formed by applying successive build plies with ply drop ratios that vary throughout the S-curve surface profile 218 from the first segment 202 to the second segment 222. This blended surface profile 218 effectively eliminates any apparent deviations that are present in the structure to which the panel is applied.

In other instances, the method includes applying successive build plies such that a portion of the S-curve surface profile 218a adjacent to the first build ply 206 or the last build ply 220 is not curvature-continuous with the first build ply 206 or the last build ply 220, respectively.

In another instance, a method of producing a panel spanning a discontinuity includes forming a tool 20. The discontinuity is defined between a first segment 202 and the second segment 222 and has a lateral displacement 203 and a longitudinal displacement 205, as indicated in FIGS. 2-5. In such aspects, forming the tool 20 further includes applying a first build ply 206 to an initial ply 204, with the initial ply 204 partially co-extending with the first segment 202 and at least spanning the lateral displacement 203. The first build ply 206 has a leading edge 207 and a thickness 209. Forming the tool 20 further includes applying the first build ply 206 to the initial ply 204 such that the leading edge 207 of the first build ply 206 is proximal or adjacent to the first segment 202. Next, forming the tool 20 includes applying a second build ply 208 to the first build ply 206, the second build ply 208 having a leading edge 213 and defining a thickness 215, and the second build ply 208 being applied to the first build ply 206 such that its leading edge 213 is laterally displaced toward the second segment 222 from the leading edge 207 of the first build ply 206. Furthermore, forming the tool 20 includes applying successive build plies to build on the second build ply 208, the successive build plies including a medial section 22 of build plies and a last build ply 220, such that the last build ply 220 partially co-extends with the second segment 222. Each of the successive build plies has a leading edge and defines a thickness and is applied to a previous build ply such that its leading edge is coincident with, or is laterally displaced toward the second segment 222 from the leading edge of the previous build ply. The lateral displacement between the leading edges of the successive build ply and the previous build ply, in relation to the thickness of the successive build ply, defines a ply drop ratio. In one embodiment, the ply drop ratio of successive build plies decreases up to the medial section 22 and increases from the medial section 22 to the last build ply 220 such that a surface profile 218 defined by the last build ply 220, the first build ply 206, and the leading edges of the build plies therebetween define a substantially curvature-continuous surface profile 218 extending between the first segment 202 and the second segment 222. The panel 200 is then formed by applying a panel assembly material to the formed tool 20 such that the panel assembly material extends from the first segment 202 to the second segment 222, in conformity with the substantially curvature-continuous surface profile 218 extending therebetween. The panel assembly material applied to the formed tool 20 includes composite materials and may further include a metal mesh, high strength fabrics, tape with metal mesh, fiber glass, copper foil, and so on.

In another embodiment, the method of producing a panel spanning a discontinuity may include ply drops that are interspersed with plies that follow the preceding plies, as indicated with reference to FIG. 3. The method described above further applies to a substantially curvature-continuous surface profile formed for such a panel or tool. Also, as described earlier, the substantially-curvature continuous surface profile thus formed in the above method can form either a part of the tool surface (either OML or IML) or it may be part of the panel surface (with a differently shaped tool surface).

The present disclosure thus includes, without limitation, the following clauses:

Clause 1: A method of forming a tool for producing a panel spanning a discontinuity, the discontinuity being defined between a first segment and a second segment, and having a lateral displacement and a longitudinal displacement, the method comprising: applying a first build ply to an initial ply, the initial ply partially co-extending with the first segment and at least spanning the lateral displacement, the first build ply having a leading edge and defining a thickness, and the first build ply being applied to the initial ply such that the leading edge thereof is proximal to the first segment; applying a second build ply to the first build ply, the second build ply having a leading edge and defining a thickness, and the second build ply being applied to the first build ply such that the leading edge thereof is laterally displaced toward the second segment from the leading edge of the first build ply; and applying successive build plies to build on the second build ply, the successive build plies including a medial section of build plies and a last build ply, such that the last build ply partially co-extends with the second segment, each of the successive build plies having a leading edge and defining a thickness, and being applied to a previous build ply such that the leading edge thereof is coincident with, or is laterally displaced toward the second segment from, the leading edge of the previous build ply, the lateral displacement between the leading edges of the successive build ply and the previous build ply, in relation to the thickness of the successive build ply, defining a ply drop ratio, the ply drop ratio of successive build plies decreasing up to the medial section and increasing from the medial section to the last build ply such that a surface defined by the last build ply, the first build ply 206, and the leading edges of the build plies therebetween define a substantially curvature-continuous surface profile extending between the first segment and the second segment and prior to applying the successive build plies, determining a shape of the substantially curvature-continuous surface based on an adjusted ply drop ratio for at least a portion of the successive build plies, wherein the adjusted ply drop ratio is directly proportional to a linear ply drop ratio, and inversely proportional to a softness factor and a ply drop number, the softness factor ranging from 0 to 1, the ply drop number being the number of the build ply between the first build ply and the last build ply.

Clause 2: The method of Clause 1, wherein applying successive build plies comprises applying successive build plies such that the ply drop ratio of successive build plies in the medial section is constant or linear, and such that the leading edges of the build plies in the medial section define a linear surface profile.

Clause 3: The method of claim 1, wherein determining a shape of the substantially curvature-continuous surface based on an adjusted ply drop ratio for at least a portion of the successive build plies comprises: determining the shape of the substantially curvature-continuous surface profile based on an adjusted ply drop ratio for each of the successive build plies.

Clause 4: The method of any preceding clause, or any combination of preceding clauses, wherein determining a shape of the substantially curvature-continuous surface based on an adjusted ply drop ratio for at least a portion of the successive build plies comprises determining the shape of the substantially curvature-continuous surface profile based on a faceted ply drop ratio, wherein the faceted ply drop ratio is a maximum of: a predetermined minimum ply drop ratio and the adjusted ply drop ratio.

Clause 5: The method of Clause 4, wherein determining the shape of the substantially curvature-continuous surface profile further comprises determining the shape of the substantially curvature-continuous surface profile based on the faceted ply drop ratio being the maximum of the predetermined minimum ply drop ratio of about 10:1 and the adjusted ply drop ratio.

Clause 6: The method of any preceding clause, or any combination of preceding clauses, further comprising adjusting the ply drop ratio of successive build plies to minimize visible surface deviations in the panel formed from the tool.

Clause 7: The method of Clause 6, wherein adjusting the ply drop ratio of successive build plies comprises adjusting the ply drop ratio of successive build plies between about 10:1 and about 500:1 to minimize visible surface deviations in the panel formed from the tool.

Clause 8: The method of any of Clauses 1 or 3-7, wherein applying successive build plies comprises applying successive build plies such that the substantially curvature-continuous surface profile extending between the first segment and the second segment forms an S-curve surface profile.

Clause 9: The method of Clause 8, wherein applying successive build plies comprises applying successive build plies such that a portion of the S-curve surface profile adjacent to the initial ply or the last build ply is not curvature-continuous with the first build ply or the last build ply.

Clause 10: A method of producing a panel spanning a discontinuity, the discontinuity being defined between a first segment and a second segment, and having a lateral displacement and a longitudinal displacement, the method comprising: forming a tool, comprising: applying a first build ply to an initial ply, the initial ply partially co-extending with the first segment and at least spanning the lateral displacement, the first build ply having a leading edge and defining a thickness, and the first build ply being applied to the initial ply such that the leading edge thereof is proximal to the first segment; applying a second build ply to the first build ply, the second build ply having a leading edge and defining a thickness, and the second build ply being applied to the first build ply such that the leading edge thereof is laterally displaced toward the second segment from the leading edge of the first build ply; and applying successive build plies to build on the second build ply, the successive build plies including a medial section of build plies and a last build ply, such that the last build ply partially co-extends with the second segment, each of the successive build plies having a leading edge and defining a thickness, and being applied to a previous build ply such that the leading edge thereof is coincident with, or is laterally displaced toward the second segment from, the leading edge of the previous build ply, the lateral displacement between the leading edges of the successive build ply and the previous build ply, in relation to the thickness of the successive build ply, defining a ply drop ratio, the ply drop ratio of successive build plies decreasing up to the medial section and increasing from the medial section to the last build ply such that a surface defined by the last build ply, the first build ply 206, and the leading edges of the build plies therebetween define a substantially curvature-continuous surface profile extending between the first segment and the second segment; and prior to applying the successive build plies, determining a shape of the substantially curvature-continuous surface profile based on an adjusted ply drop ratio for at least a portion of the successive build plies, wherein the adjusted ply drop ratio is directly proportional to a linear ply drop ratio, and inversely proportional to a softness factor and a ply drop number, the softness factor ranging from 0 to 1, the ply drop number being the number of the build ply between the first build ply and the last build ply; and forming a panel by applying a panel assembly material to the formed tool such that the panel assembly material extends from the first segment to the second segment, in conformity with the substantially curvature-continuous surface profile extending therebetween.

Clause 11: The method of Clause 10, wherein applying successive build plies comprises applying successive build plies such that the ply drop ratio of successive build plies in the medial section is constant or linear, and such that the leading edges of the build plies in the medial section define a linear surface profile.

Clause 12: The method of any of Clauses 10-11, wherein forming the panel comprises: applying a surface of the panel assembly material to the formed tool such that the surface of the formed panel defines an outer mold line (OML) of the formed panel or defines an inner mold line (IML) of the formed panel.

Clause 13: The method of any of Clauses 10-12, wherein forming the panel further comprises forming the panel as a portion of an aircraft wing, forming the panel as a portion of an aircraft nacelle, forming the panel as a portion of an aircraft fuselage, or forming the panel as a portion of an aircraft empennage.

Clause 14: The method of any of Clauses 10-13, wherein determining a shape of the substantially curvature-continuous surface profile is based on an adjusted ply drop ratio for at least a portion of the successive build plies comprises determining the shape of the substantially curvature-continuous surface based on an adjusted ply drop ratio for each of the successive build plies.

Clause 15: The method of any of Clauses 10-14, wherein determining a shape of the substantially curvature-continuous surface profile based on an adjusted ply drop ratio for at least a portion of the successive build plies comprises: determining the shape of the substantially curvature-continuous surface profile based on a faceted ply drop ratio, wherein the faceted ply drop ratio is a maximum of: a predetermined minimum ply drop ratio and the adjusted ply drop ratio.

Clause 16: The method of Clause 15, wherein determining the shape of the substantially curvature-continuous surface profile further comprises determining the optimum shape of the substantially curvature-continuous surface profile based on the faceted ply drop ratio being the maximum of the predetermined minimum ply drop ratio of about 10:1 and the adjusted ply drop ratio.

Clause 17: The method of any of Clauses 10-16, wherein forming a tool further comprises: adjusting the ply drop ratio of successive build plies to minimize visible surface deviations in the panel formed from the tool.

Clause 18: The method of Clause 17, wherein adjusting the ply drop ratio of successive build plies comprises adjusting the ply drop ratio of successive build plies between about 10:1 and about 500:1 to minimize visible surface deviations in the panel formed from the tool.

Clause 19: The method of any of Clauses 10 and 12-18, wherein applying successive build plies comprises applying successive build plies such that the substantially curvature-continuous surface profile extending between the first segment and the second segment forms an S-curve surface profile.

Clause 20: The method of Clause 19, wherein applying successive build plies comprises applying successive build plies such that a portion of the S-curve surface profile adjacent to the first build ply or the last build ply is not curvature-continuous with the first build ply or the last build ply.

Clause 21: A tool for producing a panel spanning a discontinuity, the discontinuity being defined between a first segment and a second segment, and having a lateral displacement and a longitudinal displacement, comprising: a first build ply applied to an initial ply, the initial ply partially co-extending with the first segment and at least spanning the lateral displacement, the first build ply having a leading edge and defining a thickness, and the first build ply being arranged such that the leading edge thereof is proximal to the first segment; a second build ply applied to the first build ply, the second build ply having a leading edge and defining a thickness, and the second build ply being arranged such that the leading edge thereof is laterally displaced toward the second segment from the leading edge of the first build ply; and successive build plies applied to build on the second build ply, the successive build plies including a medial section of build plies and a last build ply, the last build ply partially co-extending with the second segment, each of the successive build plies having a leading edge and defining a thickness, and being arranged relative to a previous build ply such that the leading edge thereof is coincident with, or is laterally displaced toward the second segment from, the leading edge of the previous build ply, the lateral displacement between the leading edges of the successive build ply and the previous build ply, in relation to the thickness of the successive build ply, defining a ply drop ratio, the ply drop ratio of successive build plies decreasing up to the medial section and increasing from the medial section to the last build ply such that a surface defined by the last build ply, the first build ply, and the leading edges of the build plies therebetween define a substantially curvature-continuous surface profile extending between the first segment and the second segment, wherein a shape of the substantially curvature-continuous surface profile is based on an adjusted ply drop ratio for at least a portion of the successive build plies, wherein the adjusted ply drop ratio is directly proportional to a linear ply drop ratio, and inversely proportional to a softness factor and a ply drop number, the softness factor ranging from 0 to 1, the ply drop number being the number of the build ply between the first build ply and the last build ply.

Clause 22: The tool of Clause 21, wherein the ply drop ratio of successive build plies in the medial section is constant or linear, such that the leading edges of the build plies in the medial section define a linear surface profile.

Clause 23: The tool of Clause 21, wherein the shape of the substantially curvature-continuous surface profile is based on an adjusted ply drop ratio for each of the successive build plies.

Clause 24: The tool of Clauses 21-23, wherein the shape of the substantially curvature-continuous surface profile is further based on a faceted ply drop ratio, wherein the faceted ply drop ratio is a maximum of: a predetermined minimum ply drop ratio and the adjusted ply drop ratio.

Clause 25: The tool of Clause 24, wherein the predetermined minimum ply drop ratio is about 10:1.

Clause 26: The tool of Clause 21-23, wherein the ply drop ratio of successive build plies ranges between about 10:1 and about 500:1.

Clause 27: The tool of Clause 21-23, wherein a surface of the tool having a panel assembly material applied thereto to form the panel, between the first and second segments and in conformity with the substantially curvature-continuous surface profile extending therebetween, defines an outer mold line (OML) of the formed panel or defines an inner mold line (IML) of the formed panel.

Clause 28: The tool of Clause 21, wherein the substantially curvature-continuous surface profile extending between the first segment and the second segment forms an S-curve surface profile.

Clause 29: The tool of Clause 28, wherein a portion of the S-curve surface profile adjacent to the first build ply or the last build ply is not curvature-continuous with the first build ply or the last build ply.

Clause 30: A method of forming a tool for producing a panel spanning a discontinuity, the discontinuity being defined between a first segment and a second segment, and having a lateral displacement and a longitudinal displacement, the method comprising: applying a first build ply to an initial ply, the initial ply partially co-extending with the first segment and at least spanning the lateral displacement, the first build ply having a leading edge and defining a thickness, and the first build ply being applied to the initial ply such that the leading edge thereof is proximal to the first segment; applying a second build ply to the first build ply, the second build ply having a leading edge and defining a thickness, and the second build ply being applied to the first build ply such that the leading edge thereof is laterally displaced toward the second segment from the leading edge of the first build ply; and applying successive build plies to build on the second build ply, the successive build plies including a medial section of build plies and a last build ply, such that the last build ply partially co-extends with the second segment, each of the successive build plies having a leading edge and defining a thickness, and being applied to a previous build ply such that the leading edge thereof is coincident with, or is laterally displaced toward the second segment from, the leading edge of the previous build ply, the lateral displacement between the leading edges of the successive build ply and the previous build ply, in relation to the thickness of the successive build ply, defining a ply drop ratio, the ply drop ratio of successive build plies decreasing up to the medial section and increasing from the medial section to the last build ply such that a surface defined by the last build ply, the first build ply 206, and the leading edges of the build plies therebetween define a substantially curvature-continuous surface profile extending between the first segment and the second segment, the substantially curvature continuous profile having an amount of less than 25% of the profile that includes one or more linear portions.

Clause 31. The method of Clause 30, further comprising: prior to applying the successive build plies, determining a shape of the substantially curvature-continuous surface based on an adjusted ply drop ratio for at least a portion of the successive build plies, wherein the adjusted ply drop ratio is directly proportional to a linear ply drop ratio, and inversely proportional to a softness factor and a ply drop number, the softness factor ranging from 0 to 1, the ply drop number being the number of the build ply between the first build ply and the last build ply.

Clause 32: The method of Clause 31, wherein applying successive build plies comprises applying successive build plies such that the ply drop ratio of successive build plies in the medial section is constant or linear, and such that the leading edges of the build plies in the medial section define a linear surface profile.

Clause 33: The method of claim 31, wherein determining a shape of the substantially curvature-continuous surface based on an adjusted ply drop ratio for at least a portion of the successive build plies comprises: determining the shape of the substantially curvature-continuous surface profile based on an adjusted ply drop ratio for each of the successive build plies.

Clause 34: The method of any of Clauses 31-33, wherein determining a shape of the substantially curvature-continuous surface based on an adjusted ply drop ratio for at least a portion of the successive build plies comprises determining the shape of the substantially curvature-continuous surface profile based on a faceted ply drop ratio, wherein the faceted ply drop ratio is a maximum of: a predetermined minimum ply drop ratio and the adjusted ply drop ratio.

Clause 35: The method of Clause 34, wherein determining the shape of the substantially curvature-continuous surface profile further comprises determining the shape of the substantially curvature-continuous surface profile based on the faceted ply drop ratio being the maximum of the predetermined minimum ply drop ratio of about 10:1 and the adjusted ply drop ratio.

Clause 36: The method of any of Clauses 30-35, further comprising adjusting the ply drop ratio of successive build plies to minimize visible surface deviations in the panel formed from the tool.

Clause 37: The method of Clause 36, wherein adjusting the ply drop ratio of successive build plies comprises adjusting the ply drop ratio of successive build plies between about 10:1 and about 500:1 to minimize visible surface deviations in the panel formed from the tool.

Clause 38: The method of any of Clauses 30-31 or 33-37, wherein applying successive build plies comprises applying successive build plies such that the substantially curvature-continuous surface profile extending between the first segment and the second segment forms an S-curve surface profile.

Clause 39: The method of Clause 38, wherein applying successive build plies comprises applying successive build plies such that a portion of the S-curve surface profile adjacent to the initial ply or the last build ply is not curvature-continuous with the first build ply or the last build ply.

Clause 40: The method of any of Clauses 30-31 and 33-38, wherein the substantially curvature continuous profile is curvature continuous throughout the entire profile.

Clause 41: A tool for producing a panel spanning a discontinuity, the discontinuity being defined between a first segment and a second segment, and having a lateral displacement and a longitudinal displacement, comprising: a first build ply applied to an initial ply, the initial ply partially co-extending with the first segment and at least spanning the lateral displacement, the first build ply having a leading edge and defining a thickness, and the first build ply being arranged such that the leading edge thereof is proximal to the first segment; a second build ply applied to the first build ply, the second build ply having a leading edge and defining a thickness, and the second build ply being arranged such that the leading edge thereof is laterally displaced toward the second segment from the leading edge of the first build ply; and successive build plies applied to build on the second build ply, the successive build plies including a medial section of build plies and a last build ply, the last build ply partially co-extending with the second segment, each of the successive build plies having a leading edge and defining a thickness, and being arranged relative to a previous build ply such that the leading edge thereof is coincident with, or is laterally displaced toward the second segment from, the leading edge of the previous build ply, the lateral displacement between the leading edges of the successive build ply and the previous build ply, in relation to the thickness of the successive build ply, defining a ply drop ratio, the ply drop ratio of successive build plies decreasing up to the medial section and increasing from the medial section to the last build ply such that a surface defined by the last build ply, the first build ply, and the leading edges of the build plies therebetween define a substantially curvature-continuous surface profile extending between the first segment and the second segment.

Clause 42. The tool of Clause 41, wherein a shape of the substantially curvature-continuous surface profile is based on an adjusted ply drop ratio for at least a portion of the successive build plies, wherein the adjusted ply drop ratio is directly proportional to a linear ply drop ratio, and inversely proportional to a softness factor and a ply drop number, the softness factor ranging from 0 to 1, the ply drop number being the number of the build ply between the first build ply and the last build ply.

Many modifications and other embodiments of the inventions set forth herein will come to mind to one skilled in the art to which these disclosed embodiments pertain having the benefit of the teachings presented in the foregoing descriptions and the associated drawings. Therefore, it is to be understood that embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure. In this regard, for example, different combinations of elements and/or functions than those explicitly described above are also contemplated within the scope of the disclosure. Although specific terms are employed herein, they are used in a generic and descriptive sense only and not for purposes of limitation.

It should be understood that although the terms first, second, etc. may be used herein to describe various steps or calculations, these steps or calculations should not be limited by these terms. These terms are only used to distinguish one operation or calculation from another. For example, a first calculation may be termed a second calculation, and, similarly, a second step may be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

That which is claimed:

1. A tool for producing a panel spanning a discontinuity, the discontinuity being defined between a first segment and a second segment, and having a lateral displacement and a longitudinal displacement, comprising:
    a first build ply applied to an initial ply, the initial ply partially co-extending with the first segment and at least spanning the lateral displacement, the first build ply having a leading edge and defining a thickness, and the first build ply being arranged with the leading edge of the first build ply proximal to the first segment;
    a second build ply applied to the first build ply, the second build ply having a leading edge and defining a thickness, and the second build ply being arranged with the leading edge of the second build ply laterally displaced toward the second segment from the leading edge of the first build ply; and
    successive build plies applied to build on the second build ply, the successive build plies including a medial section of build plies and a last build ply, the last build ply partially co-extending with the second segment, each of the successive build plies having a leading edge and defining a thickness, and being arranged relative to a previous build ply such that the leading edge thereof is coincident with, or is laterally displaced toward the second segment from, the leading edge of the previous build ply, the lateral displacement between the leading edges of the successive build ply and the previous build ply, in relation to the thickness of the successive build ply, defining a ply drop ratio, the ply drop ratio of successive build plies decreasing up to the medial section and increasing from the medial section to the last build ply such that a surface defined by the last build ply, the first build ply, and the leading edges of the build plies therebetween define a substantially curvature-continuous surface profile extending between the first segment and the second segment, wherein a shape of the substantially curvature-continuous surface profile is based on an adjusted ply drop ratio for at least a portion of the successive build plies, wherein the adjusted ply drop ratio is directly proportional to a linear ply drop ratio, and inversely proportional to a softness factor and a ply drop number, the softness factor ranging from 0 to 1, the ply drop number being the number of the build ply between the first build ply and the last build ply.

2. A method of forming a tool for producing a panel spanning a discontinuity, the discontinuity being defined between a first segment and a second segment, and having a lateral displacement and a longitudinal displacement, the method comprising:
    applying a first build ply to an initial ply, the initial ply partially co-extending with the first segment and at least spanning the lateral displacement, the first build ply having a leading edge and defining a thickness, and the first build ply being applied to the initial ply such that the leading edge thereof is proximal to the first segment;
    applying a second build ply to the first build ply, the second build ply having a leading edge and defining a thickness, and the second build ply being applied to the first build ply such that the leading edge thereof is laterally displaced toward the second segment from the leading edge of the first build ply;
    applying successive build plies to build on the second build ply, the successive build plies including a medial section of build plies and a last build ply, such that the last build ply partially co-extends with the second segment, each of the successive build plies having a leading edge and defining a thickness, and being applied to a previous build ply such that the leading edge thereof is coincident with, or is laterally displaced toward the second segment from, the leading edge of the previous build ply, the lateral displacement between leading edges of the successive build ply and the previous build ply, in relation to the thickness of the successive build ply, defining a ply drop ratio, the ply drop ratio decreasing up to the medial section and increasing from the medial section to the last build ply such that a surface defined by the last build ply, the first build ply, and the leading edges of the build plies therebetween define a substantially curvature-continuous surface profile extending between the first segment and the second segment; and prior to applying the successive build plies, determining a shape of the substantially curvature-continuous surface profile based on an adjusted ply drop ratio for at least a portion of the successive build plies, wherein the adjusted ply drop ratio is directly proportional to a linear ply drop ratio, and inversely proportional to a softness factor and a ply drop number, the softness factor ranging from 0 to 1, the ply drop number being the number of the build ply between the first build ply and the last build ply.

3. The method of claim 2, wherein applying successive build plies comprises applying successive build plies such that the ply drop ratio of successive build plies in the medial section is constant or linear, and such that the leading edges of the build plies in the medial section define a linear surface profile.

4. The method of claim 2, wherein determining a shape of the substantially curvature-continuous surface profile based on an adjusted ply drop ratio for at least a portion of the successive build plies comprises determining the shape of the substantially curvature-continuous surface profile based on an adjusted ply drop ratio for each of the successive build plies.

5. The method of claim 2, wherein determining a shape of the substantially curvature-continuous surface profile based on an adjusted ply drop ratio for at least a portion of the successive build plies comprises determining the shape of the substantially curvature-continuous surface profile based on a faceted ply drop ratio, wherein the faceted ply drop ratio is a maximum of: a predetermined minimum ply drop ratio and the adjusted ply drop ratio.

6. The method of claim 5, wherein determining the shape of the substantially curvature-continuous surface profile further comprises determining the shape of the substantially curvature-continuous surface profile based on the faceted ply drop ratio being the maximum of the predetermined minimum ply drop ratio of about 10:1 and the adjusted ply drop ratio.

7. The method of claim 2, further comprising:
adjusting the ply drop ratio of successive build plies to minimize visible surface deviations in the panel formed from the tool.

8. The method of claim 7, wherein:
adjusting the ply drop ratio of successive build plies comprises adjusting the ply drop ratio of successive build plies between about 10:1 and about 500:1 to minimize visible surface deviations in the panel formed from the tool.

9. The method of claim 2, wherein applying successive build plies comprises applying successive build plies such that the substantially curvature-continuous surface profile extending between the first segment and the second segment forms an S-curve surface profile.

10. The method of claim 9, wherein applying successive build plies comprises applying successive build plies such that a portion of the S-curve surface profile adjacent to the first build ply or the last build ply is not curvature-continuous with the first build ply or the last build ply.

11. A method of producing a panel spanning a discontinuity, the discontinuity being defined between a first segment and a second segment, and having a lateral displacement and a longitudinal displacement, the method comprising:

forming a tool, comprising:
applying a first build ply to an initial ply, the initial ply partially co-extending with the first segment and at least spanning the lateral displacement, the first build ply having a leading edge and defining a thickness, and the first build ply being applied to the initial ply such that the leading edge thereof is proximal to the first segment;

applying a second build ply to the first build ply, the second build ply having a leading edge and defining a thickness, and the second build ply being applied to the first build ply such that the leading edge thereof is laterally displaced toward the second segment from the leading edge of the first build ply;

applying successive build plies to build on the second build ply, the successive build plies including a medial section of build plies and a last build ply, such that the last build ply partially co-extends with the second segment, each of the successive build plies having a leading edge and defining a thickness, and being applied to a previous build ply such that the leading edge thereof is coincident with, or is laterally displaced toward the second segment from, the leading edge of the previous build ply, the lateral displacement between the leading edges of the successive build ply and the previous build ply, in relation to the thickness of the successive build ply, defining a ply drop ratio, the ply drop ratio of successive build plies decreasing up to the medial section and increasing from the medial section to the last build ply such that a surface defined by the last build ply, the first build ply, and the leading edges of the build plies therebetween define a substantially curvature-continuous surface profile extending between the first segment and the second segment;

prior to applying the successive build plies, determining a shape of the substantially curvature-continuous surface profile based on an adjusted ply drop ratio for at least a portion of the successive build plies, wherein the adjusted ply drop ratio is directly proportional to a linear ply drop ratio, and inversely proportional to a softness factor and a ply drop number, the softness factor ranging from 0 to 1, the ply drop number being the number of the build ply between the first build ply and the last build ply; and forming a panel by applying a panel assembly material to the formed tool such that the panel assembly material extends from the first segment to the second segment, in conformity with the substantially curvature-continuous surface profile extending therebetween.

12. The method of claim 11, wherein applying successive build plies comprises applying successive build plies such that the ply drop ratio of successive build plies in the medial section is constant or linear, and such that the leading edges of the build plies in the medial section define a linear surface profile.

13. The method of claim 11, wherein forming the panel comprises: applying a surface of the panel assembly material to the formed tool such that the surface of the formed panel defines an outer mold line (OML) of the formed panel or defines an inner mold line (IML) of the formed panel.

14. The method of claim 11, wherein forming the panel further comprises forming the panel as a portion of an aircraft wing, forming the panel as a portion of an aircraft nacelle, forming the panel as a portion of an aircraft fuselage, or forming the panel as a portion of an aircraft empennage.

15. The method of claim 11, wherein
determining a shape of the substantially curvature-continuous surface profile is based on an adjusted ply drop ratio for at least a portion of the successive build plies comprises determining the shape of the substantially curvature-continuous surface based on an adjusted ply drop ratio for each of the successive build plies.

16. The method of claim 15, wherein determining a shape of the substantially curvature-continuous surface profile based on an adjusted ply drop ratio for at least a portion of the successive build plies comprises: determining the shape of the substantially curvature-continuous surface profile based on a faceted ply drop ratio, wherein the faceted ply drop ratio is a maximum of: a predetermined minimum ply drop ratio and the adjusted ply drop ratio.

17. The method of claim 16, wherein determining the shape of the substantially curvature-continuous surface profile further comprises determining the optimum shape of the substantially curvature-continuous surface profile based on the faceted ply drop ratio being the maximum of the predetermined minimum ply drop ratio of about 10:1 and the adjusted ply drop ratio.

18. The method of claim 11, wherein forming a tool further comprises:
adjusting the ply drop ratio of successive build plies to minimize visible surface deviations in the panel formed from the tool.

19. The method of claim 18, wherein:
adjusting the ply drop ratio of successive build plies comprises adjusting the ply drop ratio of successive build plies between about 10:1 and about 500:1 to minimize visible surface deviations in the panel formed from the tool.

20. The method of claim 11, wherein applying successive build plies comprises applying successive build plies such that the substantially curvature-continuous surface profile extending between the first segment and the second segment forms an S-curve surface profile (218a).

21. The method of claim 20, wherein applying successive build plies comprises applying successive build plies such that a portion of the S-curve surface profile adjacent to the first build ply or the last build ply is not curvature-continuous with the first build ply or the last build ply.

* * * * *